United States Patent Office 3,477,900

Patented Nov. 11, 1969

3,477,900

PANELS FOR PRINTED CIRCUIT MANUFACTURE AND PROCESS FOR MAKING THE SAME

Victor G. Soukup, Wyoming, and Raymond W. Horst, Cincinnati, Ohio, assignors to The Cincinnati Milling Machine Co., Cincinnati, Ohio No Drawing. Filed July 29, 1966, Ser. No. 568,751
Int. Cl. B32b 17/10; C08f 21/00
U.S. Cl. 161—194 11 Claims

ABSTRACT OF THE DISCLOSURE

A copper-clad plastic panel comprising a copper sheet having a glass fiber reinforced plastic base molded thereto is disclosed. The plastic of the base consists of a copolymer of an alkyd resin and methyl methacrylate containing from 60–90% of the alkyd component.

This invention relates generally to the field of printed circuitry and more particularly to an improved copper-clad plastic laminate for use in the manufacture of printed circuits and to a method of making the same.

Laminated panels for the manufacture of printed circuits are commonly made by coating a copper foil with a layer of adhesive and then laminating a resin-impregnated sheet to the adhesive layer to produce a resinous base to which the copper is adherent. The sheet that is impregnated may be paper or glass fibers in the form of a mat or cloth. Phenolic and epoxy resins have been commonly used as impregnating resins.

While such laminated panels have been extensively used in the manufacture of printed circuits, it is generally recognized that they are subject to a number of disadvantages. One group of these disadvantages arises out of the fact that in the course of manufacture of printed circuits the laminate is brought into contact with a molten soldering bath at a temperature of the order of 500° F. and the consequent heating of the laminated panel causes certain difficulties. For example, this heating of the panel may induce vaporization of residual solvent in the adhesive layer and cause the copper cladding to blister. Heating of the panel may tend to cause degradation of the polymer and loss of mechanical strength. Also if the temperature coefficient of expansion of the resin is higher than that of copper, the panel tends to warp when subjected to the heat of the soldering bath. Another disadvantage of the prior laminates is that the adhesion of the copper to the base laminate often varies considerably. It is important that the panel have both a high order of adhesion between the copper foil and the resinous base, and a high degree of uniformity of adhesion, particularly in circuits in which the printed wiring is 0.1 inch or thinner in width.

In U.S. Patent 3,149,021 a copper-clad panel is disclosed which overcomes many of these difficulties. The resinous base of the panel is composed largely of poly (methyl methacrylate), which has excellent electrical properties, and the problems arising out of the use of an adhesive are eliminated by molding the resinous base directly to the copper foil. Since methyl methacrylate polymers do not bond well to copper, a minor proportion of unsaturated polyester is incorporated with the methyl methacrylate prior to molding to produce panels that exhibit both good adhesion and a high degree of uniformity of adhesion.

While panels produced in this manner are of exceptionally high quality, there are certain applications in respect to which an improvement in particular properties of the panel would be desirable. For example, it is occasionally necessary to repair a printed circuit manually using a soldering iron. If the soldering is done rapidly and skillfully, no delamination of the foil and base occurs.

However, if the soldering iron is held in contact with the circuit element too long, excessive heating of the foil tends to cause softening of the poly(methyl methacrylate) base with consequent localized loss of adhesion between the copper and the base. Also in the manufacture of printed circuits resist inks are applied to and removed from the copper foil on the panel. In removing certain types of resist inks chlorinated solvents are used, and the resistance of the poly(methyl methacrylate) base to the chlorinated solvents is not as high as is desirable.

Both the resistance of the resinous base to chlorinated solvents and its softening temperature can be increased by increasing the amount of unsaturated polyester in relation to the methyl methacrylate until the polyester comprises a major proportion of the molding composition. However, an increase in the proportion of polyester is generally accompanied by a decrease in adhesion of the copper foil to the resinous base. As the proportion of polyester is increased beyond that taught in U.S. Patent 3,149,021, the adhesion rapidly falls to an unacceptable value.

It is accordingly an object of the present invention to provide an improved copper-clad panel adapted to be used in printed circuit manufacture. It is another object of the invention to provide a copper-clad panel having mechanical and electrical properties comparable to those of the poly(methyl methacrylate)-base panels referred to above and in addition having improved resistance to chlorinated solvents and a higher softening temperature. Other objects of the invention will be in part obvious and in part pointed out hereafter.

The present invention is based on the discovery that while it is generally true that in the case of resinous bases for copper-clad panels molded from mixtures of methyl methacrylate and unsaturated polyester a high proportion of polyester results in poor adhesion, it is possible by using a particular type of polyester to employ a high proportion of the alkyd component and still achieve good adhesion between the copper foil and the resinous base. More particularly, it has been found that good adhesion between the foil and base can be obtained at high alkyd contents when the alkyd is a condensation product of one or more alpha, beta-unsaturated dicarboxylic acids and a mixture of two or more glycols, preferably monoalkylene glycols having 2 to 10 carbon atoms. In view of the fact that in panels of the type described above, increasing proportions of the alkyd generally produce decreased adhesion, it is surprising and unexpected that alkyds formed from a mixture of 2 to 10-carbon glycols do not produce this effect.

The glycols used in forming the alkyd are preferably those containing no ether linkage, although it has been found that up to 50% by weight of glycol ethers may be used if desired. The glycols that can be used in forming the mixed alkyd include ethylene glycol and the several isomers of propylene, butylene, pentylene and hexylene glycol, as well as neopentyl glycol, hydroxypivalyl hydroxypivalate, 1,10-decanediol and unsaturated glycols, e.g., 2-butene-1,4,diol. In cases where the glycol mixture used to form the alkyd contains a minor amount of glycol having an ether linkage, the glycol ether may be, for example, a polyalkylene glycol, e.g., diethylene glycol, triethylene glycol, dipropylene glycol and the like, as well as relatively high molecular weight polyalkylene glycols. Also small amounts of hydroxy compounds containing more than two hydroxyl groups, e.g., trimethylol propane, can be incorporated in the glycol mixture if desired.

Among the alpha-unsaturated acids that can be used in preparing the alkyds to be used in forming the panels of the present invention are maleic, fumaric and itaconic acids and their anhydrides, as well as mixtures of such acids and anhydrides. The unsaturated acids may be mixed with a minor amount, say up to 25% by weight, of saturated acids without significant diminution in the adhesion of the copper foil to the molded panel. Typical saturated acids that may be used are adipic, succinic and phthalic acids and their anhydrides.

The alkyds may be made by condensation procedures known in the art, typical procedures being given in the specific examples set forth hereinafter. In general, while an excess of either the glycol or acid ingredient can be used, it is desirable that approximately equi-molar proportions be used.

In making the copper-clad panels of the invention, the alkyd formed from the glycol mixture and unsaturated acid is mixed with methyl methcrylate, either in monomeric form or in a partially polymerized fluid form that can be prepared either by partially polymerizing the monomer or by dissolving preformed polymer in the methacrylate monomer. The alkyd is used in such proportions that it comprises from 60% to 90% by weight of the mixture of polymerizable resins. The panels are made by applying the resin mixture directly to the surface of a suitable copper foil and subjecting the resin layer and foil to heat and pressure to cause the resin layer to polymerize in contact with the foil and adhere thereto. As indicated in the specific examples given below, a small amount of catalyst is desirably incorporated in the resin mixture prior to molding to accelerate the polymerization thereof. Any of the known methyl methacrylate polymerization catalysts such as benzoyl peroxide, lauroyl peroxide and tertiary butyl perbenzoate may be used.

As indicated above, in the art of printed circuit manufacture it is customary to reinforce the resinous base of the panel with fibrous materials, e.g., glass or synthetic resin fibers in matted or woven fabric form, as well as non-woven cellulosic materials, e.g., paper. Also various subsidiary components are usually incorporated in the resinous base to provide a panel capable of meeting certain service requirements including a number of requirements other than those mentioned above. For example fillers such as calcium sulfate, aluminum silicates, clays, calcium carbonate, silica, calcium metasilicate, alumina, antimony oxide, and chlorinated biphenyl and terphenyl may be incorporated in the composition. Suitable fire retarding agents, such as chlorinated alkyl and aryl hydrocarbons may also be included. Typical fibrous reinforcements and subsidiary components useful in making the present panels are described in U.S. Patent No. 3,149,021.

An illustrative procedure for making the panels of the invention may comprise the following steps: A piece of copper foil is carefully cleaned and a suitable reinforcing structure such as a layer of mated glass fibers or glass cloth is laid on the cleaned surface of the foil. The polymerizable resin mixture containing the catalyst and subsidiary components is then spread over the layer of glass fibers and flows into contact with the copper foil. The resulting composite structure is heated under pressure to interpolymerize the methylmethacrylate and alkyd and produce the molded base of the panel to which the copper foil firmly adheres. The resulting panel may be desirably subjected to a suitable post-cure treatment to ensure complete polymerization of the monomers and prepolymers from which the base is formed.

In order to point out more fully the nature of the present invention, the following specific examples are given of illustrative methods of carrying out the invention. In the examples the amounts of materials used are given in parts by weight unless otherwise indicated.

EXAMPLE 1

A resin flask fitted with a stainless steel blade stirrer, thermometer, gas inlet tube, distilling head with condenser and a means of collecting the evolved liquids, was changed with 901.6 parts of maleic anhydride, 503 parts of 1,5-pentanediol, and 503 parts of 2,2-dimethyl-1,3-propanediol (neopentyl glycol). The mole ratio of anhydride to glycols was 1:1.05. Heating of the reaction mixture was accomplished by a thermostatically controlled oil bath. Nitrogen was bubbled through the mixture throughout the esterification. The reaction mixture was heated to 190° C. and maintained there for 2.5 hours, at which time most of the water had distilled off. The remaining water was removed at 10 mm. Hg over the course of one hour. The temperature was reduced to 165° C. and 0.01 part of hydroquinone added to act as stabilizer. The acid number of the product was 19.

The resulting alkyd resin was mixed with methyl methacrylate monomer in such proportions as to produce a mixture having an alkyd/methacrylate ratio of 75:25. A 190-gram portion of this mixture was catalyzed by the addition of 1.9 grams of benzoyl peroxide, spread onto a 12" x 12" piece of 0.0014 inch thick electrolytic copper foil, placed into a mold and heated for ten minutes under a pressure of 200 p.s.i. at a temperature of 112° C. At the end of this period the alkyd-monomer composition had polymerized to a hard rigid plastic sheet strongly adherent to the copper foil.

To a second portion of 125 grams of this mixture was added 52 grams of calcined calcium silicate, 41 grams of calcined aluminum silicate, 22.6 grams of chlorinated hydrocarbon (Dechlorane sold by Hooker Chemical Co.) and 9.4 grams of antimony oxide. The mixture was vigorously stirred to produce a smooth homogeneous mix, and was catalyzed by the addition of 1.25 grams of benzoyl peroxide. The catalyzed mix was spread uniformly onto a 12" x 12" square of 0.0014 inch thick electrolytic copper foil, a piece of glass fiber reinforcement laid thereon and, then the layup was placed into a mold and heated for ten minutes under a pressure of 200 p.s.i. at a temperature of 112° C. The resulting filled laminate was hard and rigid and the plastic sheet was strongly adherent to the copper foil.

The copper-clad plastic panels were tested for copper adherence by a standard peel test wherein a strip of the copper foil 1 inch wide was pulled at a 90° angle from the plastic base and the force required for separation of copper from the base measured. The measured values in pounds per inch are recorded in Table I below. Insulation resistance of the present panels was measured at the end of 1 hour in a 50% relative humidity atmosphere at 23° C. (Condition A) and at the end of 100 hours in a 100% relative humidity atmosphere at 40° C. (Condition C). The insulation resistance tests were carried out using interlocking comb pattern test circuits prepared by silk screening onto the copper surface of the laminate the desired circuit with acid resistant ink and etching away the unwanted copper.

An additional insulation resistance test was used (Condition X) wherein a test piece having the same interlocking comb pattern was exposed to a 15-p.s.i. saturated steam atmosphere for 30 minutes. The insulation resistance values in megohms are recorded below:

TABLE I

| | Av. Peel, lb./in. | Insulation Resistance | | |
|---|---|---|---|---|
| | | Cond. A | Cond. C | Cond. X |
| Unfilled, unreinforced | 7.7 | $>2.0\times10^7$ | 120,000 | 50,000 |
| Filled, reinforced | 7.5 | $>2.0\times10^7$ | 15,750 | 18,750 |

EXAMPLE 2

A resin flask of the type described in Example 1 was charged with 180 parts maleic anhydride and 854 parts fumaric acid. To this was added 435 parts of 1,4-butanediol, 114 parts of 1,6-hexanediol, and 294 parts of 1,2-propanediol. The mole ratio of acids to glycols was 1:1.05. Nitrogen was bubbled through the mixture throughout the esterification. The reaction mixture was heated to 190° C. and maintained there for 2.5 hours at which time water evolution had essentially ceased. The remaining water was removed at 10 mm. Hg over a 30 minute period. The temperature was reduced to 165° C. and 0.01 part hydroquinone added to stabilize the resin. The acid number of the product was 43.

Copper-clad laminates were prepared as described in Example 1 and the peel strength and insulation resistance measured with the results indicated in Table II.

TABLE II

| | Av. Peel, lb./in. | Insulation Resistance | | |
|---|---|---|---|---|
| | | Cond. A | Cond. C | Cond. X |
| Unfilled, unreinforced | 6.9 | >2.0×10^7 | >2.0×10^7 | >2.0×10^7 |
| Filled, reinforced | 7.9 | >2.0×10^7 | 160,000 | 25,000 |

EXAMPLE 3

A resin flask of the type described in Example 1 was charged with 1067.8 parts of fumaric acid. To this was added 435 parts of 1,4-butanediol and 512.3 parts of diethylene glycol. The mole ratio of acid to glycols was 1:1.05. Nitrogen was bubbled through the mixture throughout the esterification. The reaction mixture was heated to 180° C. and maintained there for 4.5 hours plus an additional hour at 10 mm. Hg while final traces of water were being removed. The temperature was reduced to 165° C. and 0.01 part hydroquinone stabilizer was added. The acid number of the product was 39. Copper-clad laminates were prepared as described in Example 1 and tested with the results given below:

TABLE III

| | Av. Peel, lb./in. | Insulation Resistance | | |
|---|---|---|---|---|
| | | Cond. A | Cond. C | Cond. X |
| Unfilled, unreinforced | 8.2 | 2.0×10^7 | 800,000 | 309,000 |
| Filled, reinforced | 6.0 | 2.0×10^7 | 400,000 | 80,000 |

EXAMPLE 4

A resin flask was charged with 901.6 parts of maleic anhydride, 570 parts of 1,6-hexanediol and 367.6 parts of propylene glycol. The mole ratio of anhydride to glycols was 1:1.05. Nitrogen was bubbled through the reaction mixture throughout the esterification. The reaction mixture was heated to 175° C. for 6 hours and an additional ¾ hour at 10 mm. Hg to remove the last traces of water from the reaction. The temperature was reduced to 165° C. and 0.01 part hydroquinone added. The acid number of the product was 48.

Copper-clad laminates were prepared as described in Example 1 and tested with the results given below.

TABLE IV

| | Av. Peel, lb./in. | Insulation Resistance | | |
|---|---|---|---|---|
| | | Cond. A | Cond. C | Cond. X |
| Unfilled, unreinforced | 7.4 | >2.0×10^7 | >2.0×10^7 | 1.0×10^6 |
| Filled, reinforced | 6.4 | >2.0×10^7 | 425,000 | ---------- |

EXAMPLE 5

A resin flask was charged with 901.6 parts of maleic anhydride, 348 parts of 1,4-butanediol, 114 parts of 1,6-hexanediol, 76.9 parts of diethylene glycol, 45 parts of ethylene glycol and 257 parts of propylene glycol. The mole ratio of anhydride to glycols was 1:1.05. Nitrogen was bubbled through the mixture throughout the esterification. The reaction mixture was heated to 195° C. for 2½ hours and an additional ½ hour at 10 mm. Hg while final traces of water were being removed. The temperature was reduced to 165° C. and 0.01 part hydroquinone stabilizer added. The acid number of the product was 46.

Copper-clad laminates were prepared as described in Example 1 and tested with the results given below.

TABLE V

| | Av. Peel, lb./in. | Insulation Resistance | | |
|---|---|---|---|---|
| | | Cond. A | Cond. C | Cond. X |
| Unfilled, unreinforced | 8.1 | >2.0×10^7 | 188,000 | 750,000 |
| Filled, reinforced | 7.6 | >2.0×10^7 | 1,400 | 500 |

EXAMPLE 6

A resin flask was charged with 1067.8 parts of fumaric acid, 348 parts of 1,4-butanediol, 114 parts of 1,6-hexanediol, 296 parts of hydroxypivalyl hydroxypivalate and 257 parts of propylene glycol. The mole ratio of acid to glycols was 1:1.05. Nitrogen was bubbled through the mixture throughout the esterification. The reaction mixture was heated to 180° C. for approximately 3 hours, at the end of which time water evolution had essentially ceased. The last traces of water were removed at 10 mm. Hg for ¾ hour. The temperature was reduced to 165° C. and 0.91 part hydroquinone added to stabilize the resin. The acid number of the product was 47.

Copper-clad laminates were prepared as described in Example 1 and tested with the results given below.

TABLE VI

| | Av. Peel, lb./in. | Insulation Resistance | | |
|---|---|---|---|---|
| | | Cond. A | Cond. C | Cond. X |
| Unfilled, unreinforced | 7.8 | >2.0×10^7 | 71,250 | >2.0×10^7 |
| Filled, reinforced | 7.0 | >2.0×10^7 | 55,750 | 90,000 |

EXAMPLE 7

A resin flask was charged with 854 parts of fumaric acid, 239 parts of itaconic acid, 348 parts of 1,4-butanediol, 114 parts of 1,6-hexanediol, 153.8 parts of diethylene glycol and 257 parts of propylene glycol. The mole ratio of acids to glycols was 1:1.05. Nitrogen was bubbled through the mixture throughout the esterification. The reaction mixture was heated to 180° C. and maintained at that temperature for 6 hours. The pressure was reduced to 10 mm. Hg to strip off the final traces of water during a ¾ hour period at 180° C. The temperature was reduced ot 165° C. and 0.01 part hydroquinone added to stabilize the resin. The acid number of the product was 47. Copper-clad laminates were prepared as described in Example 1 and tested with the results given below.

TABLE VII

| | Av. Peel, lb./in. | Insulation Resistance | | |
|---|---|---|---|---|
| | | Cond. A | Cond. C | Cond. X |
| Unfilled, unreinforced | 7.9 | >2.0×10^7 | ------------ | >2.0×10^7 |
| Filled, reinforced | 7.6 | >2.0×10^7 | 8,000 | 14,000 |

EXAMPLE 8

A resin flask of the type disclosed in Example 1 was modified by placing a non-cooled condenser into one neck of the flask, on top of which the distilling head and collector for evolved liquids were placed. The flask was charged with 383 parts of isophthalic acid, 348 parts of 1,4-butanediol, 57 parts 1,6-hexanediol and 256 parts of diethylene glycol. Nitrogen was bubbled through the reaction mixture throughout the esterification. The reaction mixture was heated to 215° C. and maintained for ½ hour. The reaction mixture was then cooled to 90° C. and 802 parts of fumaric acid and 220.5 parts of propylene glycol added, after which the mixture heated to an average temperature of 185° C. for 2 hours. Pressure was reduced to 10 mm. Hg and final traces of water stripped during a ½ hour period. After reducing the temperature to 165° C., 0.01 part hydroquinone were added. The acid number of the product was 47.5. Copper-clad laminates were prepared as described in Example 1 and tested with the results given below.

TABLE VIII

| | Av. Peel, lb./in. | Insulation Resistance Cond. A | Cond. C | Cond. X |
|---|---|---|---|---|
| Unfilled, unreinforced | 5.9 | >$2.0\times10^7$ | >$2.0\times10^7$ | 550,000 |
| Filled, reinforced | 5.0 | >$2.0\times10^7$ | 290,000 | 325,000 |

EXAMPLE 9

A resin flask of the type described in Example 1 was charged with 898.66 parts maleic anhydride, 294 parts of diethylene glycol, 385 parts of neopentyl glycol, 193 parts of 1,5-pentanediol and 124 parts of trimethylolpropane. The mole ratio of anhydride to glycols was 1:1.009. Nitrogen was bubbled through the mixture throughout the esterification. The reaction mixture was heated to 180° C. and maintained there for 3 to 4 hours until almost all the water was distilled away. The pressure was reduced to 10 mm. Hg for ¾ hour to strip off the remaining water. After reducing the temperature to 165° C., 0.01 part hydroquinone was added to stabilize the resin. The acid number of the product was 35. Panels prepared by laminating this resin to 0.0014 inch copper foil exhibited an average peel strength of 7.7 lb./in. and insulation resistance at Condition A greater than $2.0\times10^7$ megohms.

EXAMPLE 10

A resin flask was charged with 854 parts fumaric acid, 278.5 parts of 1,4-butanediol, 91 parts of 1,6-hexanediol, 205.5 parts of propylene glycol and 102 parts of 2-butene-1,4-diol. The mole ratio of acid to glycols was 1:1.05. Nitrogen was bubbled through the mixture throughout the esterification. The reaction mixture was heated to 190° C. and maintained for 2 hours. The pressure was reduced to 10 mm. Hg to strip off final traces of water during a ¾ hour period at 180° C. The temperature was reduced to 165° C. and 0.01 part hydroquinone added to stabilize the resin system. The acid number of the product was 60. Copper-clad laminates prepared as described in Example 1 were tested with the following results.

TABLE IX

| | Av. Peel, lb./in. | Insulation Resistance Cond. A | Cond. X |
|---|---|---|---|
| Unfilled, unreinforced | 6.9 | >$2.0\times10^7$ | 950,000 |
| Filled, reinforced | 7.9 | >$2.0\times10^7$ | 25,000 |

EXAMPLE 11

A resin flask was charged with 1067.8 parts of fumaric acid, 348 parts of 1,4-butanediol, 168 parts of 1,10-decanediol, 153.8 parts of diethylene glycol and 257 parts of propylene glycol. The mole ratio of anhydride to glycols was 1:1.05. Nitrogen was bubbled through the mixture throughout the esterification. The reaction mixture was heated to 185° C. for 2 hours and an additional ½ hour at 10 mm. Hg to remove final traces of water. The temperature was reduced to 165° C. and 0.01 part hydroquinone added as a stabilizer. The acid number of the product was 42. Copper-clad laminates were prepared as described in Example 1 and tested with the following results.

TABLE X

| | Av. Peel, lb./in. | Insulation Resistance Cond. A | Cond. X |
|---|---|---|---|
| Unfilled, unreinforced | 7.7 | >$2.0\times10^7$ | 10,250 |
| Filled, reinforced | 7.6 | >$2.0\times10^7$ | 6,250 |

EXAMPLE 12

A resin flask was charged with 854 parts of fumaric acid, 239 parts of itaconic acid, 348 parts of 1,4-butanediol, 114 parts of 1,6-hexanediol, 153.8 parts of diethylene glycol and 257 parts of propylene glycol. The mole ratio of acid to glycols was 1:1.05. Nitrogen was bubbled through the mixture throughout the esterification. The reaction mixture was heated to 180° C. and maintained there approximately 3.5 hours plus an additional hour at 10 mm. Hg while final traces of water were being removed. The temperature was reduced to 165° C. and 0.01 part of hydroquinone stabilizer added. The acid number of the product was 48.

Filled, reinforced laminates were prepared as described in Example 1, except that the ratio of alkyd resin to methyl methacrylate was varied in the manner indicated in the table below. The resulting laminates were tested for peel strength and insulation resistance with the results indicated in Table XI.

TABLE XI

| | Av. Peel. lb./in. | Insulation Resistance Cond. A | Cond. C | Cond. X |
|---|---|---|---|---|
| Alkyd/MMA: | | | | |
| 90/10 | 6.2 | $2.0\times10^7$ | 1,250 | 25,000 |
| 75/25 | 6.4 | $2.0\times10^7$ | 2,825 | 27,750 |
| 60/40 | 6.3 | $2.0\times10^7$ | 16,750 | 46,750 |

As pointed out in the introductory portion of the present specification, copper-clad laminates made in accordance with the present invention are characterized by exceptionally good thermal resistance. The extent of the improvement in this property that is obtained is indicated in Table XII below which summarizes data collected in tests wherein the performance of the present laminates was compared with that of several prior art laminates under exceptionally severe conditions.

In these tests 1" x 3" specimens of the laminate were floated on the surface of molten solder, thermostatically controlled at 600° F. The specimens were removed after various periods of exposure, visually inspected to determine copper blistering, and the extent of degradation of peel strength measured. In Table XII the symbol XXXP designates a commercial copper-clad, paper-base, phenolic laminate, National Electrical Manufacturers Association grade. G–10 designates an N.E.M.A. grade copper-clad laminate having a glass-cloth-reinforced epoxy resin base. Patent 3,149,021 designates a laminate made substantially in accordance with Example 4 of U.S. Patent 3,149,021. The other four laminates tested were made in accordance with Examples 1, 6, 7 and 11 as set forth above. "Max. Exp. Time" in Table XII is the amount of time in seconds that each sample could be exposed to the 600° F. solder bath without blisters forming by delamination of the copper foil.

TABLE XII

| | Max. Exp. Time | Percent Retention of Peel Strength after indicated seconds in bath: 3 | 5 | 10 | 15 | 20 | 25 |
|---|---|---|---|---|---|---|---|
| Material: | | | | | | | |
| G–10 | 3 | 89 | | | | | |
| XXXP | 3 | 93 | | | | | |
| Pat. 3,149,021 | 5 | 100 | 98 | | | | |
| Ex. 1 | 20 | 100 | 96 | 92 | 89 | 87 | |
| Ex. 6 | 15 | 102 | 94 | 91 | 73 | | |
| Ex. 7 | 20 | 100 | 97 | 93 | 89 | 88 | |
| Ex. 11 | 25 | 90 | 86 | 83 | 78 | 67 | 65 |

The foregoing data show that all of the prior laminates developed copper blisters within 5 seconds when exposed to the 600° F. soldering bath whereas laminates prepared according to the invention resisted blistering for periods of 15 to 25 seconds. The peel strength retention measurements were consistent with the visually observed blistering effects.

In another series of tests laminates prepared according to the invention were compared with a number of prior laminates in respect to solvent resistance with the results indicated in Table XIII. More particularly, 1" by 3" samples of the laminates were subjected to the action of trichloroethylene (TCE) both in liquid form at room temperature and in hot vapor form, as well as to the action of methylene chloride (MeCl) in liquid form at room temperature.

TABLE XIII

| | TCE, R.T. | TCE, HOT | MeCl, R.T. |
|---|---|---|---|
| Material: | | | |
| XXXP | No attack after 24 hours | No attack after 15 minutes | Surface softening after 30 minutes. |
| Patent No. 3,149,021 | Severe softening after 24 hours | Severe attack after 30 sec | Severe surface softening after 30 seconds. |
| Ex. 1-10 of this appln | No attack after 24 hours | No softening after 15 min | No surface softening after 30 min. |

From the foregoing description it should be apparent that the laminates of the present invention possess to a high degree the properties required to produce printed circuits of exceptionally good quality, and that the present laminates are outstanding in their resistance to the deteriorating effects of the molten solder baths and chlorinated solvents used in printed circuit manufacture. It is of course to be understood that the foregoing examples are intended to be illustrative only and that numerous changes can be made in the ingredients, proportions and conditions disclosed therein without departing from the spirit of the invention as defined in the appended claims.

We claim:

1. A copper-clad plastic panel comprising a copper sheet having a plastic base molded thereto, the plastic of said base consisting essentially of a copolymer of alkyd resin and methyl methacrylate containing from 60% to 90% by weight of the alkyd component, said alkyd resin being the condensation product of one or more dicarboxylic acids and a mixture consisting essentially of two or more glycols having 2 to 10 carbon atoms, at least 75% by weight of the acid component of said alkyd having an olefinic bond in a position alpha to at least one of the two carboxyl groups thereof, said glycol mixture containing no more than 50% by weight of glycols having an ether linkage therein.

2. A panel according to claim 1 and wherein said base has a fibrous reinforcement.

3. A panel according to claim 2 and wherein said reinforcement is composed of glass fibers.

4. A panel according to claim 1 and wherein said dicarboxylic acids are essentially wholly olefinically unsaturated acids.

5. A panel according to claim 1 and wherein said glycols are free from ether linkages.

6. A panel according to claim 1 and wherein said alkyd resin is formed from a mixture of two glycols.

7. A panel according to claim 1 and wherein said alkyd resin is formed from a mixture of more than two glycols.

8. A copper-clad plastic panel comprising a copper sheet having a glass fiber reinforced plastic base molded thereto, the plastic of said base consisting essentially of a copolymer of an alkyd resin and methyl methacrylate containing from 60% to 90% of the alkyd component, said alkyd resin being the condensation product of one or more olefinically unsaturated dicarboxylic acids and a mixture of at least two glycols free from ether linkages.

9. The method of making a copper-clad plastic panel which comprises mixing with methyl methacrylate in the proportions of 60% to 90% by weight of said mixture an alkyd resin which is the condensation product of one or more dicarboxylic acids and a mixture of two or more glycols having 2 to 10 carbon atoms, at least 75% by weight of the acid component of said alkyd having an olefinic bond in a position alpha to at least one of the carbonyl groups thereof, spreading the methacrylate-alkyd resin mixture on the surface of a copper foil and heating the resin mixture and foil at an elevated temperature and pressure to copolymerize the resin mixture and mold it to the foil.

10. A method according to claim 9 and wherein a fibrous glass reinforcement is placed against the foil before the resin mixture is applied thereto.

11. A copper-clad plastic panel comprising a copper sheet having a plastic base molded thereto, the plastic of said base consisting essentially of a copolymer of an alkyd resin and methyl methacrylate containing from 60% to 90% by weight of the alkyd component, said alkyd resin being the condensation product of one or more dicarboxylic acids and a mixture consisting essentially of two or more glycols, at least 75% by weight of the acid component of said alkyd having an olefinic bond in a position alpha to at least one of the two carboxyl groups thereof, said glycol mixture containing no more than 50% by weight of glycols having an ether linkage therein.

References Cited

UNITED STATES PATENTS 3,149,021 9/1964 Goepfert et al. ---- 161—195 XR
3,186,898 6/1965 Melink ---- 161—214
3,393,117 7/1968 Zolg et al. ---- 161—93 X
3,419,637 12/1968 Parker ---- 260—872 X ROBERT F. BURNETT, Primary Examiner L. M. CARLIN, Assistant Examiner U.S. Cl. X.R.

156—332; 161—196, 214, 231; 260—872